United States Patent [19]
Shelton

[11] Patent Number: 4,585,207
[45] Date of Patent: Apr. 29, 1986

[54] EXPANDING GATE VALVE WITH PNEUMATIC ACTUATOR

[75] Inventor: William S. Shelton, Houston, Tex.

[73] Assignee: Joy Manufacturing Company, Pittsburgh, Pa.

[21] Appl. No.: 772,107

[22] Filed: Sep. 3, 1985

[51] Int. Cl.⁴ ............................................. F16K 31/143
[52] U.S. Cl. ........................................ 251/62; 251/63; 251/63.6; 251/196; 91/161; 92/62; 92/65
[58] Field of Search ................... 251/62, 63, 63.6, 196; 91/156, 161, 167; 92/52, 62, 65, 152

[56] References Cited

U.S. PATENT DOCUMENTS

| | | | |
|---|---|---|---|
| 3,053,050 | 9/1962 | Sommerer | 92/52 X |
| 4,296,679 | 10/1981 | Mattsson | 92/65 X |
| 4,538,506 | 9/1985 | Mattsson | 92/62 X |

Primary Examiner—Harold W. Weakley
Attorney, Agent, or Firm—Marvin J. Marnock

[57] ABSTRACT

A piston type pneumatic powered actuator (9) for operating a valve (10) of the expanding gate type wherein velocity of the piston-stem-gate drive train is maintained substantially constant in the latter stage of the actuator stroke. The actuator (9) includes an assembly of dual pistons (61,75) which are adapted to be driven by fluid pressure in one direction to operate the valve but are returned by spring means (66,67) when the fluid pressure is removed. A drive piston (61) directly connected to the actuator stem (23) is nested within a primary piston (75) which is not connected to the actuator stem (23) but moves the drive piston (61) when actuating pneumatic fluid is applied to the actuator (9). A stop (85) affixed to the primary piston (75) is adapted to cooperatively engage the actuator housing (40) to terminate the stroke of the primary piston (75) prior to termination of the stroke of the drive piston (61). An orifice (91) through the primary piston (75) allows continuing flow of actuating fluid to the face of the drive piston (61) after the stroke of the primary piston (75) is terminated. Termination of the stroke of the primary piston (75) occurs when fluid communication through the valve is first established.

4 Claims, 2 Drawing Figures

EXPANDING GATE VALVE WITH PNEUMATIC ACTUATOR

BACKGROUND OF THE INVENTION

This invention relates to expanding gate valves and more particularly to an expanding gate valve provided with a dual stage pneumatic-powered actuator.

With single stem valves which handle very high pressures, the large forces needed to operate the valve preclude the use of any manual means, such as a handwheel, and require the provision of an automatic operator. Automatic operators are also widely used in applications for operating a valve in automatic response to sensing of some changed condition as, for example, with safety valves which are incorporated in safety systems.

Heretofore, the use of fluid-powered actuators with gate valves of the expanding gate type has presented many problems. Variances in the sealing forces between expanding gate valves, even those of the same kind, usually rules out the adaptability of an actuator with a uniform thrust force for a variety of valves wherein such variant characteristics are the general rule. Also, the very large sealing forces of these valves require a very powerful actuator thrust to break the "seal" and such a powerful thrust can serously damage the valve components, such as the seal rings or the gate and segment members. A very large spring force is also needed to return the actuator piston upon release of fluid pressure from the actuator and these significantly increase the size, weight and expense of the actuator. Nevertheless, the handling of very high fluid pressures of 20,000 p.s.i. or more, as is characteristic of deep gas and oil wells, has made it very desirable that only gate valves of the expanding gate type be used, and particularly so in safety valves for very high pressure systems. As opposed to hydraulic actuators, pneumatic actuators are often times used where quick response times are needed, where reduction of the flammability hazard is important, or where pneumatic power is readily available.

In the design of actuators for expanding gate valves, the piston must be sized so minimum fluid pressure to the actuator is able to overcome the valve's gate drag plus the pressure which acts across the cross section of the stem to oppose the actuator thrust. At approximately one third of the actuator stroke distance, the gate ports and valve conduct flow passage come into communication so that pressurized fluid in the valve body cavity is vented to the flow passage. As this happens, both the gate drag and the opposing stem force are lost. If the actuator fluid is hydraulic, a small displacement of the actuator piston suffices to lower the fluid pressure driving the actuator to substantially zero so that the valve completes its stroke, as in moving from closed to open position, at a relatively slow speed determined by the flow rate of the actuator pressure source fluid and the actuator orifice inlet.

In applications where pneumatic actuators are used to control the operation of gate valves, the instant of occurrence of lost gate drag and opposing stem face during the actuator stroke allows the actuator fluid, a gas, to rapidly expand. Because the gas is compressible, the actuator piston moves a distance much greater than the valve stroke before the hydraulic actuator pressure is significantly reduced. The result is the connected "train" of actuator piston, stem and valve gate assembly moves with such greater velocity and momentum as to "slam" against the valve stop which causes the rapid expansion and very tight wedging of the gate and segment elements of the valve gate assembly in its expanded sealed condition. In addition to the likelihood of valve damage, a further disadvantage is that a very large force is required to break the "wedge" to permit further operation or "fail-safe" operation of the valve. One solution to this problem is disclosed in U.S. patent application Ser. No. 568,460, filed Jan. 5, 1984 now U.S. Pat. No. 4,535,967, which shows an expanding gate valve operated by a piston type pneumatic-powered actuator which includes a hydraulic choke means to reduce the "slam" effect. There is, of course, the possibility of leakage of hydraulic fluid from the hydraulic choke, especially over a long period of time, such that a totally pneumatic actuator system may be preferred. The provision of a hydraulic choke means also increases the number of parts and the complexity of the actuator.

Accordingly, it is an object of the invention to provide a simple and reliable pneumatic actuator for operation of a gate valve of the expandable gate type.

It is another object to provide a dual piston pneumatic-powered dual piston actuator for operation of a gate valve of the expandable gate type wherein actuator stem velocity is controlled to substantially constant velocity by restricting the flow of actuating fluid to the actuating piston at a time during the actuator stroke when the valve gate ports first come into communication with the flow passage through the valve.

A further object is to provide a pneumatic-powered dual stage actuator for actuating the control element of a mechanical device wherein actuator stem velocity is controlled by sudden restriction of air flow to the actuating drive piston means in the latter stage of actuator thrust.

SUMMARY OF THE INVENTION

The invention is directed to a dual stage pneumatic actuator for actuation of the control element of a mechanical device such as the gate assembly of an expanding gate valve. The actuator, which is mounted atop the valve housing, comprises an actuator housing defining a piston chamber, a primary piston and a secondary drive piston slidably received in the housing, and an actuator stem which connects the secondary drive piston to the valve gate assembly. The primary piston is not connected to the actuator stem but seats loosely atop the secondary drive piston when the actuator is in the de-energized condition. The actuator is responsive to a source of pneumatic fluid pressure which when applied through an inlet of the actuator housing to one side of the pistons drives the actuator stem and gate assembly to an operational open or closed position. A spring means in the piston chamber continuously urges the piston in the direction which opposes the pneumatic pressure. A secondary piston, of smaller piston area than the first, is fitted into a piston receiving bore which is formed in the fluid receiving face of the first piston. A stop member affixed to the primary piston is adapted to cooperably engage the actuator housing to limit the length of the primary piston stroke to a lesser length than that of the secondary drive piston stroke when pneumatic fluid is admitted to the piston chamber. The stop is so located that the stroke of the primary piston terminates shortly after fluid communication is established between the ports of the gate assembly components and the flow passage through the valve.

A small diameter flow control orifice through the primary piston allows continuing flow of actuating fluid to the secondary piston after the stroke of the primary piston is terminated. The flow control orifice so restricts the flow of actuating fluid acting to drive the actuator stem that the actuator stem velocity and associated momentum of the actuator stem and valve gate assembly is reduced.

DETAILED DESCRIPTION OF A PREFERRED EMBODIMENT

Figure 1:
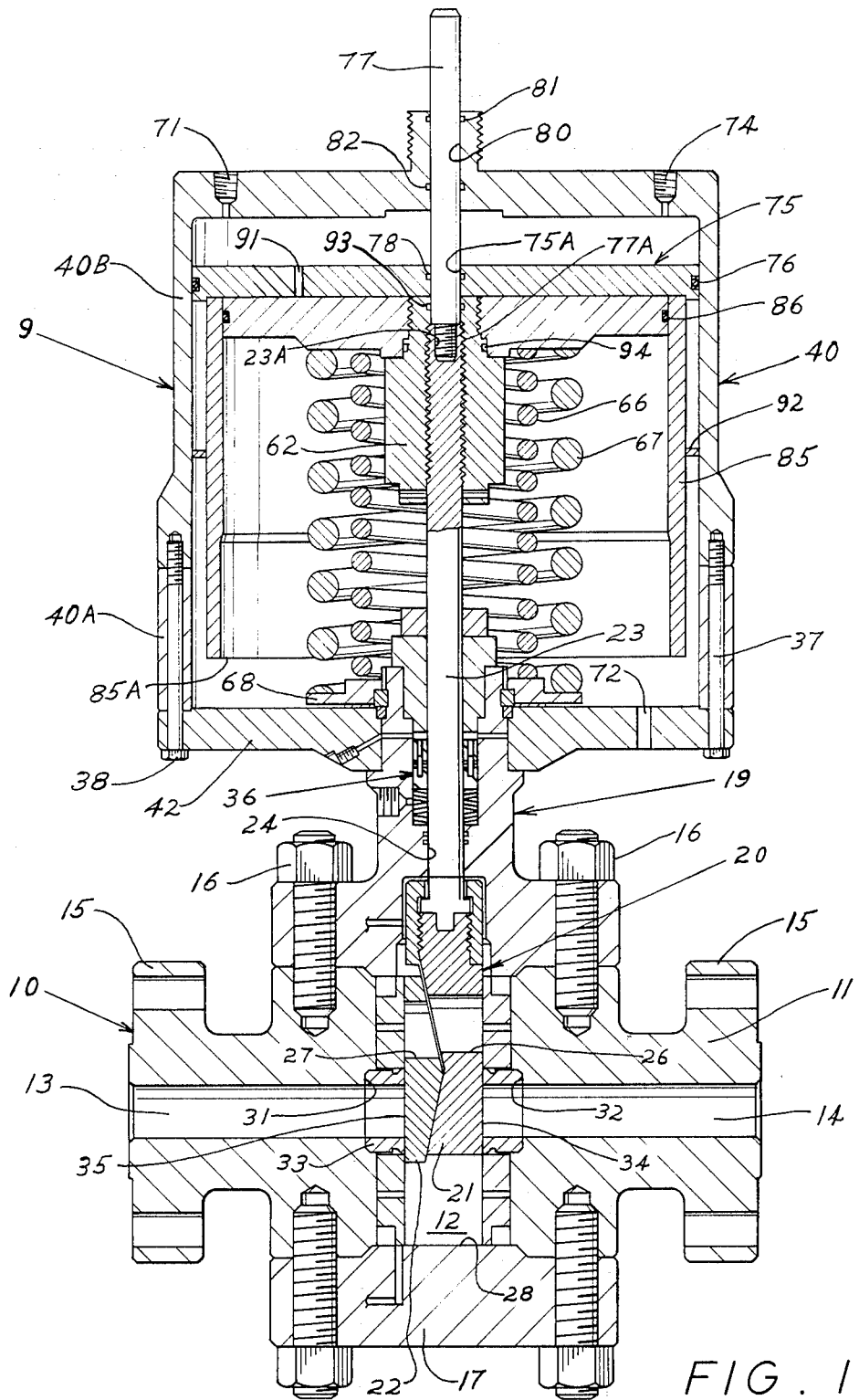
FIG. 1 is a vertical sectional view of the dual stage pneumatic actuator of this invention shown installed on the valve housing of a gate valve of the expanding gate type.

As shown in FIG. 1, the actuator 9 of this invention is shown mounted to a gate valve 10 for controlling the operation fo the valve. The valve 10 comprises a valve body 11 having a valve chamber 12 therein and inlet and outlet flow passages 13, 14 defining a flow way which extends through the valve and intersects the valve chamber 12. End flanges 15, each in surrounding relation to the flow way, are provided on the valve body to accommodate its installation in a flowline. The valve is also provided with a bonnet 19 which is bolted atop the valve body 11 by means of bolts 16 and closes off the valve chamber 12.

The valve 10 further includes a gate assembly 20 of conventional design which is mounted within the valve chamber for sliding movement transversely of the flow way to open or close the valve. The gate assembly 20 includes a gate member 21 and a segment 22. The gate member 21 is connected at its upper end to the lower end of a valve stem or actuator stem 23 which extends through a central axial bore 24 in the bonnet 19. The stem 23 is connected to the gate member 21 so that upon actuation of the stem 23 in the axial direction, as will hereinafter be described, the gate assembly 20 is movable across the flow way between a first position werein the valve is open and a second position wherein the valve is closed. In the open position of the valve, not shown, ports 26, 27 in the gate and segment members, respectively, are aligned in registry with the flow passages 13, 14. Also, as is conventional, the gate member 21 is provided with a V-shaped recess which accommodates the wedge shaped segment 22, the wedge faces of which conform to the surfaces of the V-shaped recess and are in sliding contact therewith. As is well known to those skilled in the art, the linear movement of the gate assembly to open or close the valve, causes an expansion of the gate assembly in the open and closed positions due to relative sliding movement between the gate member 21 and the segment 22, the relative sliding movement being induced by suitable stop means, such as the surface 28 of the valve end plate 17 which closes off the valve chamber 12 and which limits the vertical movement of the segment 22 relative to the gate member 21 as the gate assembly nears its valve open position. A similar stop means adjacent the top end of the valve chamber 12 restricts the movement of the segment relative to the gate member as the gate assembly nears its valve closed position.

At the inner ends of the flow passages 13, 14, the valve body 11 is provided with annular recesses 31, 32, respectively, surrounding the flow passages 13, 14 in concentric relation therewith and opening into the valve chamber 12. The annular recesses 31, 32 from seat pockets in each of which a valve seat ring 33 is inserted.

For sealing, the gate member 21 is provided with a flat outwardly facing sealing surface 34 which is oriented substantially parallel at all times to a similar sealing surface 35 on the segment 22 which faces in the opposite direction towards the inlet passage 13. When the gate assembly is expanded in the open and closed conditions of the valve, the surfaces 34, 35 establish sealing relationships with the valve seats 33. When in transit between the open and closed positions, the gate assembly assumes a collapsed condition which is induced by a suitable means (not shown) affixed to the sides of the gate and segment members for continuously urging these members to a "nested" relationship wherein the respective apexes of their inner wedge surfaces are aligned. A suitable mechanism for collapsing the gate assembly to its "nested" condition is shown in U.S. Pat. No. 4,334,666.

The gate is connected to the stem 23 by any suitable connection but is preferably a low stress stem connection such as shown in U.S. Pat. No. 3,923,285.

The stem 23 extends through the bonnet bore 24 and a packing gland assembly 36 which is mounted in an enlarged diameter portion 24a of the bonnet bore 24. Annular packing rings 38 of the packing assembly are disposed in the bore section 24a and provide fluid-tight sealing between the valve bonnet and the valve stem when compressed by the packing adapter 37 which is threaded into the enlargement 24a of the bonnet bore 24. The stem packing, of course, may be other than shown and may be any packing suitable as a valve stem shaft packing.

The actuator 9 which is used to actuate the gate valve 10 is shown mounted atop the valve body 11. The actuator 9 comprises a hollow cylindrical housing member 40 of circular cross-section which defines and actuator piston chamber 41. The cylindrical housing 40 is comprised of a lower hollow cylinder member 40A and an upper inverted cup-like member 40B of corresponding diameter. The housing 40 is closed at one end by a circular housing end member 42 and the housing members 40A, 40B are joined in coaxial relation by bolts 38 through aligned bores in the end member 42 and the housing members 40A, 40B. The housing end member 42 is formed with a central axial bore 43 which receives the upper end of the valve bonnet 19 in close fluid sealing relation therewith as the actuator is mounted on the valve 10. The end member 42 seats on an annular bonnet shoulder 44 which is formed by a reduction in diameter of the upper end of the bonnet 19.

Figure 2:
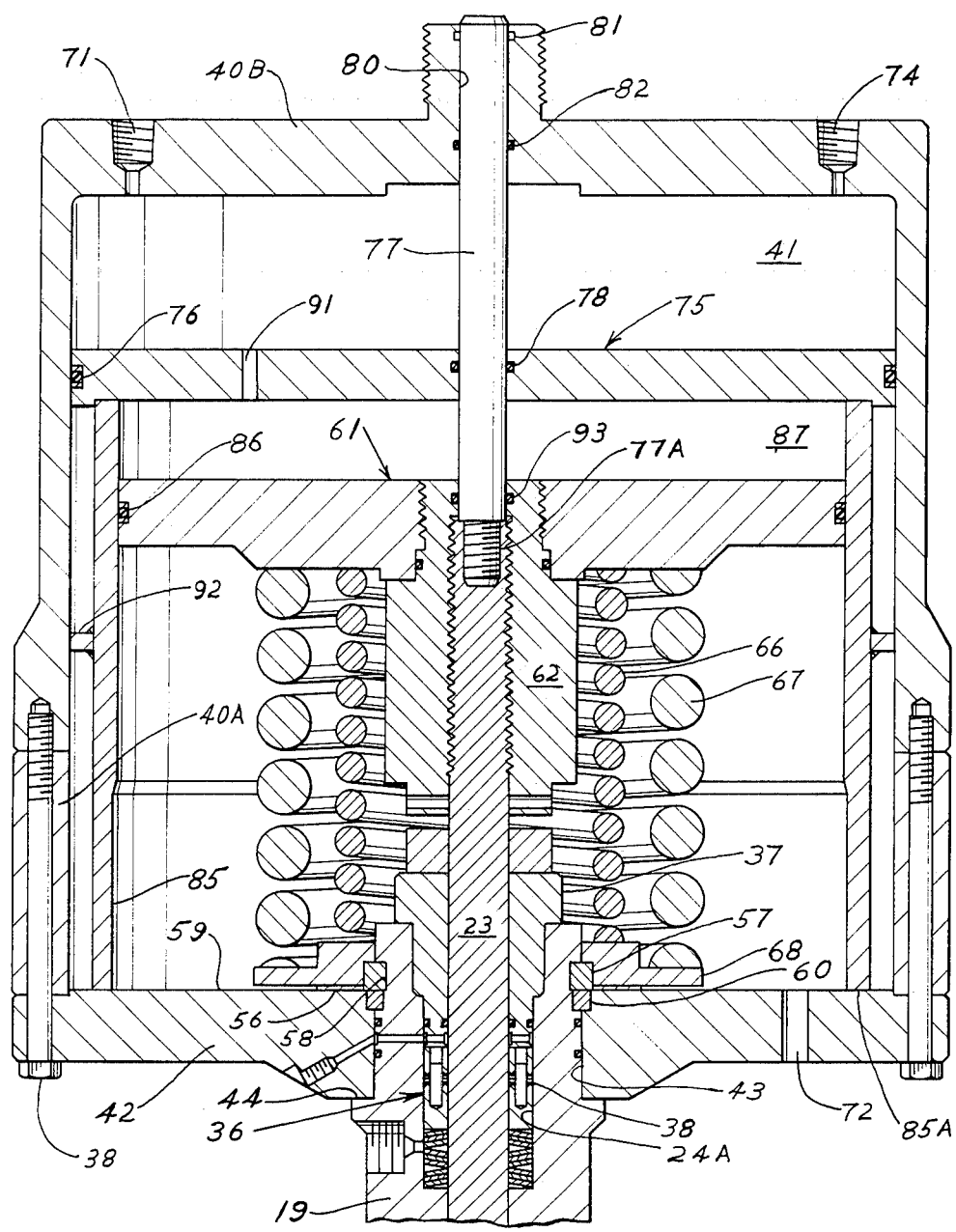
FIG. 2 is an enlarged fragmentary sectional view of the actuator of FIG. 1 showing the relative positioning of the two pistons of the actuator after pneumatic fluid under pressure has been admitted to the piston chamber of the actuator housing and the actuator has completed actuation of the gate valve.

As best shown in FIG. 2, it will be seen that the actuator 9 is secured to the top of the valve body 11 by a split ring 57 which is received in an external groove 58 formed around the exterior of the bonnet 19 near its upper end and clamps against the surface 59 of the actuator housing end member 42 which is an inner end wall of the actuator piston chamber 41. In addition, one or more keys 60 are fitted into aligned slots in the exterior of bonnet 19 and the wall formed in the central axial bore of the end member 42 to prevent any relative rotation of the actuator with respect to the valve body 11.

The actuator 9 includes a piston assembly which comprises a primary piston 75 slidably mounted in the piston chamber 41 and a drive piston 61 which is normally disposed in abutting relation to the piston 75 when the actuator is in its relaxed condition. The drive piston 61 is threaded onto the upper end of an adapter 62, which is in turn threadedly connected to the upper end of the actuator stem 23 as an extension of the stem 23. As shown, the drive piston 61 is in coaxial alignment with the actuator stem 23 and is of a diameter which is less than that of the inner diameter of the actuator housing 40 for purposes hereinafter explained.

The piston 61 is biased towards the upper end of the piston chamber 41 by a pair of coiled springs 66, 67 which are arranged in sleeved relation to one another and around the actuator stem 23 and its adapter extension 62. The upper ends of the springs 66, 67 abut the underside of the piston 61 and the lower ends of the springs abut an annular spring retainer plate 68 which is seated atop a TEFLON washer 56 and the clamp ring 57 adjacent the end member 42. For purposes of reducing the size of the actuator 9, a pair of coiled springs rather than a single spring is preferred to continuously urge the piston 61 in a direction away from the valve body 10. Since a very powerful thrust is required for actuation of a gate valve of the expanding type, the actuator 9 is provided with a unique feature for reducing the velocity of the actuator stem 23 in the latter stage of an actuator stroke. It is to be noted that with the present invention, at approximately one third of the way through an actuator stroke, fluid communication is established between the ports 26, 27 of the gate assembly members and the flow passages 13, 14. There is also an accompanying loss of gate drag and the forces opposing the actuator stem stroke such that there will be a sudden increase in actuator piston-stem velocity and momentum of the piston-stem-gate assembly unless means are provided to prevent this happening.

As a means of reducing actuator stem velocity, the invention incorporates another piston, the primary piston 75, which seats loosely atop the drive piston 61. The piston 75 is of diameter corresponding substantially to the inner diameter of the housing 40 so as to provide for a close sliding fit therebetween. Piston rings, or seals 76, are fitted in a circumferential groove around the piston 75 to insure a fluid-tight seal between the piston 75 and actuator housing 40. The piston 75 is also provided with a central axial bore 75A for accommodating a rod-like piston guide 77 which extends therethrough and is threadedly connected to the actuator stem 23 in coaxial alignment therewith. For this purpose the lower end of the piston guide 77 is formed with an externally threaded reduced diameter portion 77A which is threadedly received in a threaded bore 23A formed in the end of the actuator stem 23. The piston 75 is not rigidly connected to the guide 77 but is sleeved thereon in fluid-tight relationship established by means of an o-ring seal 78 in the central bore through the piston 75. The piston guide 77 also extends out of the actuator housing 40 through a central opening 80 which is formed in the closed upper end of the actuator housing member 40B. O-ring seals 81, 82 fitted in the wall of the opening 80 establish a fluid-tight seal between the actuator housing and the piston guide 77.

A fluid pressure inlet 71 is provided in the closed end of the housing member 40A of the actuator 9 and is formed with internal threads for accommodating its connection to a pressure conduit leading to a source of pneumatic fluid pressure. As is readily apparent, pneumatic fluid under pressure delivered to the piston chamber through the inlet 71 will drive the pistons 75 and 61 downwardly against the counterforce of the piston springs 66, 67 to where the gate assembly of the valve 10 is moved towards the bottom of the valve chamber 12 and is expanded into sealing engagement with the valve seats 33 to open the valve.

In the gate valve 10, the openings 26, 27 in the gate and segment members are located near the upper ends thereof and the valve is normally held in a "fail-safe" closed condition when the piston 61 is adjacent the upper end of the piston chamber as shown in FIG. 1. It is to be understood, of course, that the openings 26, 27 could be located nearer the lower end of the gate assembly such that the valve is in open condition when the actuator pistons are adjacent the upper end of the actuator housing. Application of pneumatic fluid to the actuator would then actuate the valve to its closed condition.

To facilitate piston operation, a single opening 72 is provided through the lower end member 42 of the actuator 9 so that the interior of the actuator housing below the piston 61 is exposed to atmospheric pressure. Also, for safety reasons a pressure relief valve may be installed in an opening 74 provided in the closed end of the actuator housing member 40A as shown in FIG. 1 and in phantom lines in FIG. 2.

Affixed as by welding or otherwise, to the underside of the piston 75 and coaxially aligned therewith is a cylindrical down-stop member 85. The drive piston 61 is disposed in close fitting relation to the inner wall of the cylindrical downstop 85 and is adapted for sliding motion therein. A fluid-tight seal is established between piston 61 and the inner wall of the downstop 85 by means of a piston ring or seal 86 located in a circumferential groove formed about the piston 61. It will thus be seen that the cylindrical downstop 85 and the piston 75 which closes off one end thereof constitute a piston chamber 87 for accommodating axial and reciprocal motion of the drive piston 61.

As seen in FIG. 1, wherein the actuator 9 is shown in its relaxed "fail-safe" valve closed position, the position 61 is "nested" against the underside of the piston 75. It will thus be seen that upon admission of pressurized pneumatic fluid into the piston chamber through the fluid inlet, the fluid acting on the fluid receiving face, the piston 75 will overcome the force of the springs 66, 67 and drive both pistons 75 and 61 towards the end of the actuator housing mounted on the valve housing. Accordingly, the actuator stem 23 is driven downwardly as shown in the drawings, to move the gate assembly transversely with respect to the flow passages 13, 14 of the valve and place the gate assembly in the open position wherein the ports 26, 27 of the gate assembly elements are disposed in register with the flow passages 13, 14 and the gate assembly is in its expanded wedged sealing condition. During the actuator stroke, however, the stroke of the piston 75 is terminated before there is a termination of the stroke of the drive piston 61 due to the engagement of the lower end surface 85A with the surface 86 of the end member 42 of the actuator housing. The axial length of the downstop 85 is selected such that the stroke of the piston 75 is terminated at the instant where the gate assembly ports 26, 27 move into fluid communication with the flow passages 13, 14 of the gate valve 10.

In order that the drive piston 61 may continue its stroke under the application of actuating pneumatic fluid into the piston chamber 41, a small orifice 91 is provided to extend through the piston 75. The orifice 91 restricts and controls the flow of actuating fluid into the chamber void formed between the pistons 61 and 75 as the drive piston 61 continues its stroke. The resulting drop in fluid pressure driving the piston 61 operates to impose a substantially constant velocity on the piston 61 throughout the remainder of the actuator stroke and thereby prevent a damaging rapid acceleration and momentum build-up of the piston-stem-gate assembly drive "train".

It is to be understood, of course, that the piston chambers 41 and 87 are fluid-tight with respect to the pistons 75 and 61 with the exception of the orifice 91. Accordingly, a seal 93 is provided to seal between the piston guide 77 and adapter 62 and seal 94 is provided to seal the connection between the adapter 62 and piston 61. In addition, an annular piston guide 92 is affixed to the inner wall of the actuator housing member 40B in close fitting relation about the stop member 85 and serves to guide the piston 61. The piston guide 77, which extends externally of the actuator housing, makes it possible to manually override the actuator 9 to operate the gate valve 10.

It is to also be understood that the foregoing description of a preferred embodiment of the invention has been presented for purposes of illustration and description and is not intended to limit the invention to the precise form disclosed. For example, the particular type of expanding gate valve may be other than shown. It is also possible to use a stop means other than the cylindrical member 85 for purposes of terminating the stroke of the primary piston. Diaphragm-type pistons could also be used in lieu of rigid pistons 75 and 61. It would also be feasible to adapt the dual stage actuator of this invention to operate various mechanisms other than gate valves where it is advantageous to reduce the latter stage of actuator thrust. Accordingly, is to be appreciated that changes may be made without departing from the spirit of the invention.

What is claimed is:

1. An actuator device for actuation of a gate valve of the expanding gate type which comprises a valve body with a valve chamber therein and a flow passage extending through said valve body and communicating with said valve chamber, an expandable gate assembly mounted within said valve chamber for movement in a collapsed condition between open and closed positions with respect to said flow passage, said gate assembly including a gate element and a segment which are expanded away from each other at said open and closed positions and are provided with ports which are aligned with one another and the flow passage in said open position, said gate element and segment being each provided with an outer sealing surface for sealing against valve seats provided in said valve body at opposite sides of the gate assembly when the gate assembly is expanded in the open and closed positions, said valve body having a bore extending form the exterior of the valve body into said valve chamber in generally transverse relation to said flow passage;

pneumatic powered actuator means for moving the gate assembly transversely with respect to said flow passage said open and closed positions, said actuator means comprising an actuator housing mounted on said valve body and defining a first piston chamber therewith;

a primary piston slidably mounted in said first piston chamber;

fluid inlet means provided through the wall of said housing and adapted for connection to a source of pneumatic pressure whereby pressurized fluid may be selectively admitted to said first piston chamber on a fluid receiving side of said primary piston;

means including one side of said primary piston for defining a second piston chamber;

a drive piston slidably received in said second piston chamber; and actuator stem connected at one end to said drive piston and at its other end to the gate assembly, said drive piston being movable with the actuator stem in the axial direction of the stem to move the gate assembly transversely with respect to said flow passage between said open and closed positions;

spring means in said actuator housing for continuously urging said drive piston to an abutting relationship with said primary piston and in a direction opposed to the pneumatic pressure applied to said primary piston, said primary piston being provided with a flow control orifice extending through the primary piston whereby pressurized pneumatic fluid admitted to said first piston chamber will be communicated to said drive piston through said flow control orifice;

and stop means for limiting the length of the primary piston stroke to a lesser length than that of the drive piston stroke when pressurized pneumatic actuating fluid is admitted to said first piston chamber, said orifice acting to restrict the flow of pneumatic actuating fluid into said second piston chamber after termination of the primary piston stroke and thereby control the velocity and momentum of said drive piston, actuator stem, and gate assembly in the operation of the gate valve by maintaining the velocity substantially constant.

2. An actuator device as described in claim 1 wherein said gate element and segment members of the valve gate assembly are provided with cooperable wedging surfaces which are adapted for relative sliding movement to cause expansion of the gate assembly in the open and closed positions.

3. An actuator device as set forth in claim 1 wherein said stop means is a cylindrical member of circular cross section affixed to one side of the primary piston and with the primary piston defines said second piston chamber for accommodating said drive piston.

4. A pneumatic powered actuator device for effecting the actuation of the control element of a mechanical device such as the valve element of a gate valve, said actuator device comprising;

an actuator housing mounted on said valve body and defining a first piston chamber therewith;

a primary piston slidably mounted in said first piston chamber;

fluid inlet means provided through the wall of said housing and adapted for connection to a source of pneumatic pressure whereby pressurized pneumatic fluid may be selectively admitted to said first piston chamber on a fluid receiving side of said primary piston;

means including one side of said primary piston for defining a second piston chamber;

a drive piston slidably received in second piston chamber; an actuator stem connected at one end to said drive piston and at its other end to said control element, said drive piston being movable with the actuator stem in the axial direction of the stem to move the control element;

spring means in said actuator housing for continuously urging said drive piston to an abutting relationship with said primary piston and in a direction opposed to the pneumatic pressure applied to said primary piston, said primary piston being provided with a flow control orifice extending through the primary piston whereby pressurized pneumatic fluid admitted to said first piston chamber will be communicated to said drive piston through said flow control orifice;

and stop means for limiting the length of the primary piston stroke to a lesser length than that of the drive piston stroke when pressurized pneumatic actuating fluid is admitted to said first piston chamber, said orifice acting to restrict the flow of pneumatic actuating fluid into said second piston chamber after termination of the primary piston stroke and thereby control the velocity and momentum of said drive piston and actuator stem in operation of said control element.

* * * * *